United States Patent [19]

Dominique et al.

[11] 4,359,043

[45] Nov. 16, 1982

[54] ROOFING MEMBER FOR COLLECTING SOLAR ENERGY

[76] Inventors: Gazel Dominique, Residence Cormontaigne 5/7; Huges Dailliez, 283, rue Nationale, both of a Lille (Nord); Denis Consigny, La Pierre Plantee, a Rousson (Gard), all of France

[21] Appl. No.: 141,806

[22] Filed: Apr. 21, 1980

[30] Foreign Application Priority Data

Apr. 27, 1979 [FR]  France .............................. 79 11526

[51] Int. Cl.³ ............................................. F24J 3/02
[52] U.S. Cl. ................................... 126/444; 126/450; 126/DIG. 2
[58] Field of Search ................. 126/DIG. 2, 417, 444, 126/449, 445, 900, 901, 443, 450; 165/135, 136, 168, 169, 170, 175

[56] References Cited

U.S. PATENT DOCUMENTS

| | | | |
|---|---|---|---|
| 2,213,894 | 9/1940 | Barry | 126/443 |
| 2,489,751 | 11/1949 | Candler | 126/417 |
| 3,981,294 | 9/1976 | Deminet et al. | 126/449 |
| 4,128,095 | 12/1978 | Oren et al. | 126/449 |
| 4,134,391 | 1/1979 | Mahdjuri et al. | 126/443 |
| 4,137,903 | 2/1979 | Annett | 126/443 |
| 4,141,338 | 2/1979 | Lof | 126/449 |
| 4,186,725 | 2/1980 | Schwartz | 126/443 |
| 4,205,655 | 6/1980 | Hunt | 126/443 |
| 4,210,122 | 7/1980 | Artwegger | 126/DIG. 2 |
| 4,273,106 | 6/1981 | Gould | 126/DIG. 2 |

FOREIGN PATENT DOCUMENTS

| | | | |
|---|---|---|---|
| 2529095 | 1/1977 | Fed. Rep. of Germany | 126/DIG. 2 |
| 2555015 | 6/1977 | Fed. Rep. of Germany | 126/DIG. 2 |
| 2722206 | 11/1978 | Fed. Rep. of Germany | 126/DIG. 2 |
| 2383403 | 11/1978 | France | 126/DIG. 2 |

*Primary Examiner*—Daniel J. O'Connor
*Attorney, Agent, or Firm*—Robert E. Burns; Emmanuel J. Lobato; Bruce L. Adams

[57] ABSTRACT

A roofing member for collecting solar energy defines an external shape and has dimensions similar to traditional roofing means such as tiles or slates. The roofing member comprises at least one transparent wall with a closed cavity below this wall, and a dark area in contact with the cavity below said wall. First and second complementary connecting means are located respectively in an area of a side of the member intended to be placed at an upper level and in an area of a side of the member intended to be placed at a lower level. In this way a mechanical connection can be made simultaneously between the first complementary connecting means of a second similar member superimposed by the said area of the side intended to be lowermost and the second complementary connecting means of the member simultaneous therewith a sealed interconnection of the respective cavities of these two members can be made in order to allow the circulation of a heat-carrying fluid from one member to the other.

15 Claims, 6 Drawing Figures

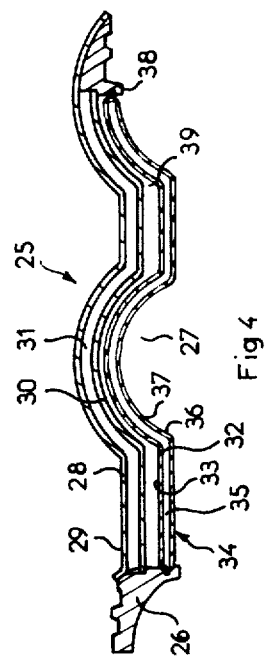
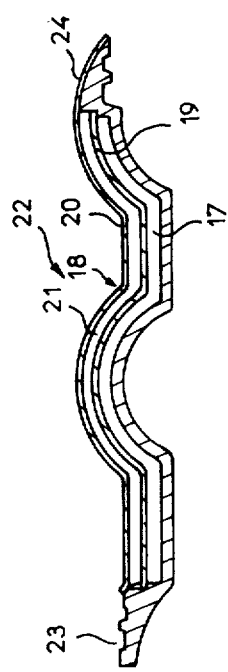
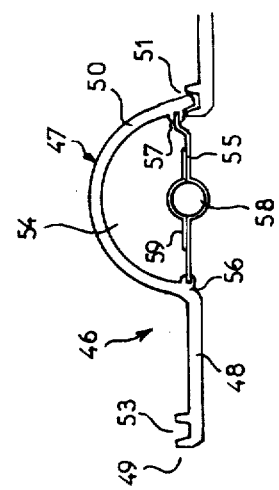
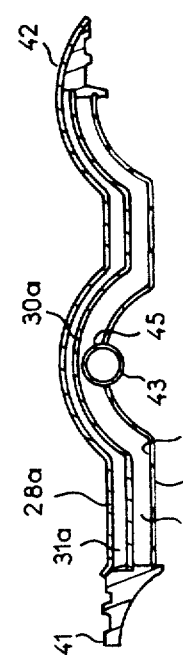

ROOFING MEMBER FOR COLLECTING SOLAR ENERGY

The present invention relates to a roofing member for a roof, which member is intended to collect solar energy.

In their best known form, solar collectors are in the form of panels of varying size, inside which one creates a glass-house effect used for heating a heat-carrying fluid which is subsequently used generally for heating purposes.

Since these panels are water-tight, it has been considered juxtaposing a plurality thereof by connecting them by water-tight seals, in order to form roofing members replacing traditional roofing members such as tiles and slates on a roof.

This solution seemed advantageous in that it made the roofs lighter, but the aesthetic result was far from satisfactory and above all, on the one hand the connection of the collectors to each other in order to allow the circulation of the heat carrying fluid and on the other hand the water-tight connection of these panels to traditional roofing members such as tiles or slates covering other areas of the roof were carried out more or less by rule of thumb, with very uncertain results in particular as regards the seal in the region of the connection.

Furthermore, the attachment of collector panels to the timber could not take place in the same manner as the connection to the latter of traditional roofing members such as tiles or slates, which most frequently necessitated a special design of the timber in its regions intended to receive solar panels; in particular, it seemed very difficult, apart from chance solutions, to locate the members forming solar energy collectors on existing timberwork, by partly replacing the tiles or slates initially provided.

In fact, it is apparent that with their present design, solar energy collectors are unsuitable for use as roofing members and the purpose of the present invention is to propose a device which is simultaneously a solar collector and a roofing member and which is perfectly suited to both of these functions.

To this end, the invention proposes a solar collector whereof the external shape is that of a traditional roofing member such as a tile or slate, or of an arrangement of these members assembled traditionally and which may consequently overlap such members in a traditional manner and be fixed in the same way as the latter to timberwork. This provides the possibility of producing roofs on traditional timberwork, in particular by replacing an existing traditional roof, in which traditional roofing members such as tiles and slates are mixed with members according to the invention, with an aesthetic and technical result, from the point of view of water-tightness, similar to that obtained when constructing a traditional roof from tiles or slates.

In order that the laying of the members according to the invention is carried out in a traditional manner, means are provided for ensuring an automatic mutual connection of the members which are placed partly one above the other in a scalloped arrangement, in order to ensure simultaneously a mutual mechanical connection of the members, ensuring the mutual interconnection whilst complementing their connection to the timberwork and a connection of the area provided inside each member for the circulation of heat-carrying fluid. The members according to the invention are laid in the same manner as traditional roofing members and an arrangement of collector members according to the invention may be put in position on a roof by a roofer using traditional methods, without any special precaution linked in particular with the necessity of interconnecting the inner areas of the collectors.

It is thus possible to combine on the same roof, a varying number of collectors according to the invention which are connected in series in order to constitute, whilst being perfectly integrated in the roof, a bank of collectors having equivalent performances to those of a traditional collector panel of large size, whatever this size.

The roofing member for a roof according to the invention, intended to collect solar energy and comprising at least one transparent wall, a closed cavity below the transparent wall, a dark area in contact with the cavity, below the transparent wall, is characterised in that externally it has the shape and dimensions of a traditional roofing member such as a tile or slate, or of an arrangement of such members and in that it comprises complementary connecting means respectively in an area of its upper side intended to be placed at an upper level and in an area of its lower side intended to be placed at a lower level, in order to ensure a mechanical connection simultaneously between a member superimposed by the said area of its lower side on the said area of the upper side of a second similar member and the sealed interconnection of the respective cavities of these two members in order to allow the circulation of a heat-carrying fluid from one to the other.

The invention will be better understood on referring to the ensuing description, relating to non-limiting embodiments, as well as to the accompanying drawings which form an integral part of this description.

FIG. 3 is a view in section through the plane III—III of FIG. 2.

FIGS. 4 to 6 show three variations of a tile according to the invention, in views similar to that of FIG. 3.

Figure 1:
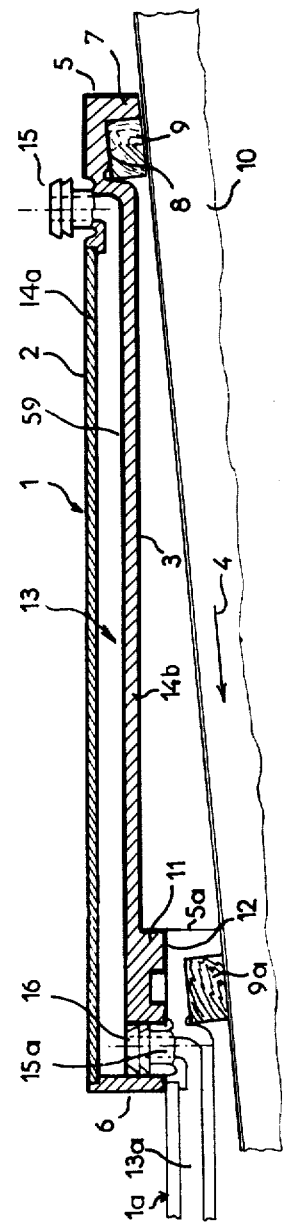
FIG. 1 is a view of a first example of a roofing member according to the invention, seen in section through a vertical plane parallel to the direction of the slope of the roof.

FIGS. 1 to 5 correspond to the case of a roofing member according to the invention having the known external shape of a flat tile and FIG. 6 to the case of a ridge tile, but a man skilled in the art will naturally be able to produce a member of this type having the external shape of other known roofing members, such as for example tiles of other shapes or slates, without diverging from the scope of the invention.

If particular reference is made to FIG. 1, where a roofing member according to the invention is drawn in full line and part of a second member according to the invention is drawn in thin line, which member is connected to the first and located at a level directly below the level of the latter in the direction of the slope of the roof, it will be seen that a member 1 according to the invention in this case comprises a front side 2 and a back side 3 which are substantially flat and parallel over the major part of their surface. In a plane parallel to the sides 2 and 3, the member having a rectangular shape defined by two longitudinal lateral edges intended to be orientated parallel to the direction of the slope of the roof 4 and an upper end portion 5 and a lower end wall 6, intended to be orientated at right angles to this direction 4 in order to define respectively the upper edge and the lower edge of the member. The sides 2 and 3 comprise, in the immediate vicinity of the longitudinal edges of the member, a similar relief which compliments that comprised by traditional tiles in this region, in order to facilitate their mutual lateral interengagement (this known relief in itself has not been shown). Furthermore, in the immediate vicinity of the upper edge of the end portion 5, over the entire lateral extent of the latter, the back side 3 comprises a projecting rim 7 connected to the remainder of the side 3 by a groove 8 also extending over the entire lateral extent of the upper end portion 5, in order to fit on a batten 9 fixed in a traditional manner to the rafters 10 of the timberwork, at right angles to the direction of the slope 4, in the manner of a traditional tile. In the vicinity of the lower end wall 6, over the entire length of the latter, the back side 3 comprises a projecting heel portion 11, whereof the lower side 12, parallel to the remainder of the side 3, is able to rest on the front side the upper end portion 5a of a member 1a according to the invention located at a level directly below that of the member 1, taking into account the direction of the slope 4, in a region of this front side located in the immediate vicinity of the upper edge of the upper end portion 5a of this member 1a. Thus, the member 1 according to the invention fits laterally with other similar members or with traditional tiles in the manner in which these traditional tiles are fitted laterally, it rests by an area of its back side located in the vicinity of its lower edge on an area of the front side of the member immediately below located in the immediate vicinity of the upper edge of this member, like traditional tiles and it fits like these traditional tiles on battens 9, to which it may be fixed in a traditional manner for example by nailing (not shown).

Internally, below the major part of its front side 2, the member 1 according to the invention comprises a sealed cavity 13 defined towards front side 2 by a rigid transparent wall 14a consisting of glass, plastics material or other transparent material, in which case the term "transparent material" is generally understood to mean a material through which incident solar radiation is able to pass. The cavity 13 is furthermore defined by a shell 14b of any rigid material such as plastics material, glass, concrete, terra cotta etc., which in particular defines the back side 3 of the member, its lateral edges, its upper end portion 5 with the rim 7 and the groove 8 and its lower end wall and the heel portion 11. The shell 14b furthermore defines the base 59 of the cavity 13, which is substantially flat and parallel to the sides 2 and 3.

The cavity 13 is able to receive internally a heat-carrying fluid which is able to convey to the point of use, the energy collected by the member, which for this purpose comprises, in an area located below a maximum of the transparent plate 2, inside the cavity 13, an area of dark colour. This area may be constituted by the base 59 of the cavity 13, which is coloured throughout its mass or painted in a dark colour, or by the heat-carrying fluid itself containing dark pigments in solution or suspension or, more generally, substances facilitating the collection of solar energy in the form of calorific energy. Preferably, the dark colour is chosen to match the colour of traditional tiles which may border the members according to the invention, in order to ensure that the roof has a homogeneous appearance close to that of a roof constructed throughout from traditional tiles. When the exterior of the member according to the invention is in the shape of a roofing member other than a tile, the dark colour is naturally chosen according to the normal colouring of this traditional roofing member.

To facilitate filling of the cavity 13 with heat-carrying fluid, which is generally liquid and the circulation of this fluid between the cavity 13 and similar cavities of adjacent roofing members and between these cavities and the utilisation circuit, complementary connection means, respectively 15 and 16 have been provided in the front side the upper end portion 5 of the member and in the back side 12 of the heel portion 11, in the vicinity of the lower end wall 6 of the member, which means 15 and 16 are furthermore able to provide mechanical connection of the members according to the invention which are adjacent each other in the direction of the slope 4.

The lower connecting means 16 in this case consist of a cylindrical orifice, the axis of which is perpendicular to the side 12, which opens on the one hand into the cavity 13 in the immediate vicinity of the edge of the latter closest to the lower end wall 6 of the member and on the other hand into the side 12 of the heel portion 11, i.e. into the back part of the lower side of the member 1 which is able to be placed on top of the front part of the upper end portion 5a of the member 1a located at a directly lower level.

The means 15 in turn consist of a tubular conduit projecting above the front side 2 of the upper end portion 5 of the member and opening into the cavity 13 in the region of the latter closest to the upper end portion 5 of. In its region projecting above the side 2, the tubular conduit has a shape of revolution about an axis perpendicular to the general plane of the side 2 with an outer diameter similar to the inner diameter of the orifice 16, the means 15 and 16 being disposed respectively on the upper side 2 and below the lower side 12 of the member so that the means 16 of the member 1 fit automatically on the means 15a of the member 1a located at a directly lower level, which means 15a are identical to the means 15, when the member 1a is correctly fitted on the batten 9a of the timberwork located at a level directly lower than that of the batten 9 and that the member 1 is fitted on this batten 9. In view of the fact that the inner diameter of the orifice 16 is similar to the outer diameter of the projecting region of the means 15a (identical to the means 15), it is easy to ensure a watertight connection between the inner periphery of the orifice 16 and the outer periphery of the projecting region of the means 15a, either by interposing a sealing material, or directly if one adopts the arrangement illustrated in which the projecting region of the means 15 or 15a comprises outer annular teeth whereof the maximum diameter is very slightly greater than the inner diameter of the orifice 16 and in which at least the means 15 are made from an elastically deformable material such as a plastics material, so that the force fitting of the means 16 on the means 15a results in a sealed connection and mutual interengagement.

Preferably, in order to ensure a flow which is as regular as possible between the cavity 13 and the similar cavity 13a of the member 1a, the projection formed by the conduit 15a (or 15) above the upper side of the member is equal to the distance separating the side 12 of the heel portion 11 from the base 59 of the cavity 13, so that the upper end of the conduit 15a is flush with the base 15 of the cavity 13.

Naturally, the connecting means 15 and 16 used in this case for connecting two members according to the invention, which are adjacent each other in the direction of the slope 4, may also be used to ensure the connection to the utilisation circuit at the top and bottom of the slope (not shown).

In one variation of the invention, in which the member is intended to simulate a traditional roofing member, intended to be connected in staggered arrangement to adjacent members, by being superimposed over two similar members located at a directly lower level, one could envisage a connection of each of the members to each of the members directly therebelow, through the intermediary of means similar to the means 16 and 15 thus provided respectively in a number equal to two or multiples of two. When the members according to the invention are intended to be placed in rows parallel to the direction of the slope, in the manner of traditional tiles and as is illustrated, one could naturally also provide a plurality of means 15 and means 16 respectively for ensuring multiple mechanical connection and circulation of the heat-carrying fluid.

Naturally one could provide methods of connection other than those which have been described and illustrated and in particular means 16 projecting below the lower side of the member, which are able to fit in upper recessed means. Whatever the embodiment chosen, the complementary connecting means will preferably be constructed so that although they ensure effective connection as regards the seal and mechanical strength, they have a certain flexibility facilitating a movement of the assembled members, due to expansion.

Figure 2:
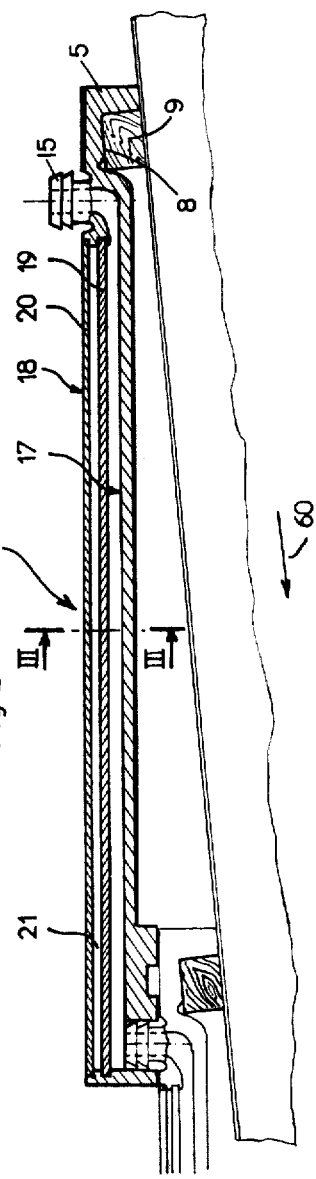
FIG. 2 is a similar view of a second example of a roofing member according to the invention.

In the variation illustrated in FIGS. 2 and 3, the member 22 according to the invention has a shape similar to that of the member 1 and, like the latter, comprises a cavity 17 on its inside, which cavity can be connected in a sealed manner to corresponding cavities of similar members located respectively at an upper level and at a lower level, taking into account the direction 60 of the slope of the roof, by means also ensuring a mechanical connection of these members.

In contrast to the cavity 13 of the member 1, the cavity 17 is not in direct contact with the transparent front wall 20, similar to the transparent wall 14, defining the major part of the front side 18 of the member, but a second wall 19 is interposed between the cavity 17 and the wall 20, which wall 19 is parallel to the wall 20 at a certain distance from the latter in order to define therewith a sealed chamber 21 which may contain a liquid or a gas, or in which it is possible to establish a partial vacuum. When the member is exposed to solar radiation, a glass-house effect is created in the chamber 21, which makes it possible to increase the quantity of calorific energy transmitted to the heat-carrying fluid circulating in the cavity 17, which is filled throughout with this heat-carrying fluid like the cavity 13 of the member 1 and internally comprises a region of dark colour defined by suitable colouration of its walls or by pigments contained in the heat-carrying fluid.

FIG. 3 shows the complementary shape of the two longitudinal edges 23 and 24 of the member 22, which edges are intended to be orientated parallel to the direction of the slope of the roof, in order to facilitate mutual lateral engagement of the members.

FIGS. 4 to 6 illustrate three variations in which the cavity able to receive the heat-carrying fluid is not defined directly by a transparent wall, but in manner known per se by an opaque wall, for example a metal wall, located at a distance behind a transparent wall which defines the front side of the member and comprising, facing this transparent wall, a side having a dark colour, preferably matching the colour of traditional roofing members with which it is desired to mix the members according to the invention.

In the case of FIG. 4, the roofing member 25 is substantially of the same outer shape as the members illustrated in FIGS. 1 to 3, in particular with a view to its connection towards the top, towards the bottom and laterally to other adjacent similar members or to traditional flat tiles.

Nevertheless, its periphery designed with a view to this connection is defined by a frame 26 open right through on the major part of its central area 27 in which are superimposed a first transparent wall 28, which is water-tight and connected in a sealed manner to the periphery of the frame 26, which wall defines the upper side 29 of the member and a second transparent wall 30, which is also water-tight and connected in a sealed manner to the frame 26 by its periphery, which wall 30 is located behind the wall 28 at a distance from the latter such that the two walls define a sealed chamber 31 therebetween, which chamber can be placed under partial vacuum or may contain a gas or liquid.

A sealed wall 32 is disposed behind the wall 30, which wall 32 is opaque and facing the walls 30 and 28, has a side 33 of dark colouring, chosen according to the colour of the traditional roofing members with which the member 25 is intended to be combined, possibly on the same roof. This wall 32 in fact constitutes the upper wall of a flat, sealed chamber 34, defining internally a cavity 35 which is able to receive a heat-carrying fluid and to be connected to similar cavities of members similar to the member 25, as in the case of the preceding examples, in order to allow the circulation of the heat-carrying fluid from one cavity 35 to the other. To this end, it is possible to use the same means as in the case of the examples illustrated in FIGS. 1 to 3, or even a variation according to which the member 25 comprises, projecting respectively above its upper side in particular defined by the transparent wall 28 and below its lower side in particular defined by the lower side 36 of the base 37 of the chamber 34, respectively in its area intended to be placed at an upper level and in its area intended to be placed at a lower level, taking into account the slope of the roof, a conduit which is able to be connected automatically to the other conduit of a member directly below or directly above, when these members are put in position on the timberwork of the roof, a sleeve comprising internally transverse dimensions similar to the outer transverse dimensions of the two conduits being able to be provided for ensuring their sealed connection. As in the case of the embodiment illustrated in FIGS. 1 to 3, toothing of the conduits combined with elasticity of the latter and/or of the sleeve may be provided in order to ensure a perfectly sealed connection and, simultaneously, a mechanical inter-connection of the members.

On its periphery, which coincides with that of its upper side 33, the flat chamber 34 is connected in a sealed manner to a rim 38 on the underside of the frame 26, so that the walls 30 and 32 define a sealed chamber 39 therebetween, which, like the chamber 31, can be placed under partial vacuum or can be filled with a gas or liquid. This chamber 39 produces a glass-house effect complementing the glass-house effect established in the chamber 31, and like the latter not being in contact with the outer air, which makes it possible to considerably improve the efficiency of the collector. However, it will also be noted that this collector could be constructed in a simpler form, by eliminating the intermediate transparent plate 30.

FIG. 5 illustrates an embodiment similar to that of FIG. 4, since it differs from the latter solely in the method of constructing the means defining the cavity for the circulation of the heat-carrying fluid.

In fact, in the case of FIG. 5, the chamber 34 of the embodiment of FIG. 4 is replaced by a single opaque wall 40 located at a distance behind a transparent wall 30a similar to the wall 30, itself located at a distance behind a transparent wall 28a similar to the wall 28, the walls 40 and 30a defining therebetween a sealed chamber 39a similar to the chamber 39 and the walls 30a and 28a defining therebetween a sealed chamber 31a similar to the chamber 31. In a central area parallel to the longitudinal edges 41 and 42 of the member, i.e. parallel to the direction of the slope when this member is fixed to roofing timber, the plate 40 includes a sealed tubular member 43 which is able to receive the heat-carrying fluid in its inside and to be connected, like the chamber 34 of the member 25 illustrated in FIG. 4, respectively by its upper part to the lower part of the similar conduit of the member immediately thereabove and by its lower part to the upper part of the similar conduit of the member immediately therebelow. In order to ensure the transmission of heat produced by the glass-house effect in the chambers 31a and 39a to the heat-carrying fluid circulating in the conduit 43, the upper side 44 of the plate 40 and the upper side 45 of the conduit 43 facing the transparent plate 30a, have a dark colouring preferably matching that of traditional roofing members with which the members according to the invention may be combined.

Naturally, as in the case of the embodiment described previously, this member could be constructed in a simplified form by eliminating the transparent wall 30a.

FIG. 6 shows a member according to the invention constructed according to a technique similar to that of the member illustrated in FIG. 5, apart from the fact that externally it is in the shape of a ridge tile. Naturally, members according to the invention belonging to any one of the embodiments illustrated in FIGS. 1 to 5 could be constructed with this external shape.

In the case of the embodiment of FIG. 6, the member 46 according to the invention comprises a transparent wall 47 having the general shape of a traditional ridge tile, i.e. comprising a flat region 48 whereof one of the edges defines a longitudinal edge 49 of the member, which is intended to be orientated in the direction of the slope and an area 50 enlarged in an upwards direction adjoining the area 48 at a point approximately along half the width of the member and defining the second longitudinal edge 51 of the latter. As in the case of a traditional tile of this type, the upper side of the member comprises, in the vicinity of the edge 49 of the latter, a groove 53 able to receive the edge of a similar adjacent member corresponding to the edge 51, or the corresponding edge of a traditional ridge tile (a connection of this type is shown in the right-hand part of FIG. 6, where the edge of another member is drawn in thin line).

In the region of the area 50, the lower side of the transparent wall 47 defines a cavity 54 which a sealed wall 55, located as an extension of the wall 48 and fixed for example by the engagement of its periphery on suitable counterparts such as 56 and 57 comprised by the area 50 in the vicinity of the back side of the wall 47, closes in a sealed manner so that a glass-house effect is established at this point.

Passing through the wall 55, over its entire length and parallel to the edges 49 and 51 of the member is a conduit 58 which at any point is comparable with the conduit 43 of the member illustrated in FIG. 5, in particular as regards its possibilities of connection to the similar conduit of the members respectively directly below and directly above, in order to establish a circulation of the heat-carrying fluid. In order to ensure maximum transmission to the heat-carrying fluid of the heat present in the cavity 54 by a glass-house effect, the upper side 59 of the wall 55 and of the conduit 58 has a dark colour preferably reproducing the colour of traditional ridge tiles, the area 48 of the transparent wall 47 also preferably being of this colour.

In the example illustrated, the conduit 58 passes through the wall 55 at a point which is midway between the areas of the wall 47 corresponding respectively to the edge 51 of the member and to the connection of the part 50 to the part 48, but naturally one could provide other positions. Furthermore, although the wall 55 has been shown flat, the latter could also be constructed to be curved reproducing the curve of the part 50 of the transparent wall 47, so that each of the areas of the wall 55 is placed substantially at the same distance from the wall 47 in order that solar radiation may reach the different areas of the dark side 59, in an identical manner, throughout the day.

According to another embodiment, one could also provide below virtually the entire transparent wall 47, i.e. also below the part 48 of the latter, a wall similar to the wall 55 and defining therewith a sealed chamber in which a glass-house effect is established.

In another embodiment of the invention, the connection of the cavities able to receive internally a heat-carrying fluid and to convey the latter, may be carried out by fitting connecting members parallel to the upper side of the tile. This connection thus varies from that described with reference to FIGS. 1 and 2, in which the members 15 and 16 are substantially perpendicular to the upper surface of the tile.

In the case of members parallel to this upper surface, the connection is carried out below the tile by the inter-engagement of a male conduit and a female sleeve. The outer diameter of the male conduit is substantially equal to the inner diameter of the female sleeve, which may also comprise an appropriate device and for example an O-ring in order to make this joint tight. This arrangement enables the various roofing members to expand. On account of this arrangement, it is also possible to fit these various members with less accuracy compared with the fitting accuracy of traditional roofs. The expansion and inaccuracy in the fitting will result in sliding of the male connecting member in the female connecting member, their tight coupling being ensured for example by the O-ring. This O-ring will preferably be placed in the female sleeve, with the aim of preventing any wear on the latter during the operations of handling the various connecting members.

Naturally, one could envisage numerous variations of the roofing member according to the invention without diverging from the scope of the latter. In particular, one could envisage the construction of a member according to the invention with the external shape of an arrangement of traditional roofing members such as tiles or slates, this member being just as able to integrate with traditional members as an individual member described above, but with the additional advantage of being able to be laid quicker.

What is claimed is:

1. A roofing construction for collecting solar energy comprising a multiplicity of like roofing members having externally the shape and dimensions of traditional roofing tiles, said members being assembled in traditional manner with lateral edges of laterally adjacent roofing members overlapping and with lower edges of upper roofing members overlapping upper edges of downwardly adjacent roofing members, each of said roofing members comprising a shell of opaque moldable material having a back wall and opposite side walls, a lower end wall and an upper end portion projecting forwardly from said back wall to form a frame for receiving a front wall, a transparent front wall received in said frame and sealed to said side walls, lower end wall and upper end portion, said transparent front wall being spaced forwardly from said back wall to provide therebetween a heat-carrying fluid cavity, said upper end portion extending longitudinally beyond said transparent front wall and lying under an upwardly adjacent roofing member, said upper end portion having in its back a channel to receive a roof support member and in its front side a first fluid-conducting coupling means having a passage communicating with said cavity, said back wall having in a lower end portion which overlies an upper end portion of a downwardly adjacent roofing member a second fluid-conducting coupling means communicating with said cavity and adapted to interfit with said first coupling means of said downwardly adjacent roofing member to interconnect adjacent roofing members mechanically and to interconnect fluid cavities of adjacent roofing members to provide for circulation of heat-carrying fluid from one roofing member to another.

2. A roofing construction according to claim 1, in which one of said interfitting coupling means is a female coupling means comprising an orifice opening into said cavity and the other of said interfitting coupling means is a male coupling means comprising a projecting tubular conduit having external transverse dimensions similar to the internal transverse dimensions of said orifice.

3. A roofing construction according to claim 2, in which said tubular conduit is of elastic deformable material and has annular teeth of which the maximum diameter is slightly greater than the internal diameter of said orifice.

4. A roofing construction according to claim 1, in which said cavity comprises the space between said transparent front wall and said opaque back wall.

5. A roofing construction according to claim 1, in which the inner face of said back wall is of a dark colour.

6. A roofing construction according to claim 1, in which the heat-carrying fluid is of a dark colour.

7. A roofing construction according to claim 1, in which a partition is interposed between said transparent front wall and opaque back wall, to form said heat-carrying fluid cavity between said partition and said back wall and a sealed chamber between said front wall and said partition.

8. A roofing construction according to claim 7, in which said partition is transparent.

9. A roofing construction according to claim 8, in which a second partition is interposed between said transparent partition and said back wall to provide a second sealed chamber between said partitions.

10. A roofing construction according to claims 9 in which said second partition is opaque and has a dark coloured front face.

11. A roofing construction according to claim 7, in which said sealed chamber contains a gas.

12. A roofing construction according to claim 7, in which said sealed chamber contains a liquid.

13. A roofing construction according to claim 7, in which said sealed chamber is under partial vacuum.

14. A roofing construction according to claim 1, in which said heat-carrying fluid cavity comprises a sealed tubular member incorporated with said back wall.

15. A roofing construction according to claim 14, in which a transparent partition is interposed between and spaced from said front wall and said back wall to provide a first sealed chamber between said front wall and said partition and a second sealed chamber between said partition and said back wall.

* * * * *